Patented June 13, 1939

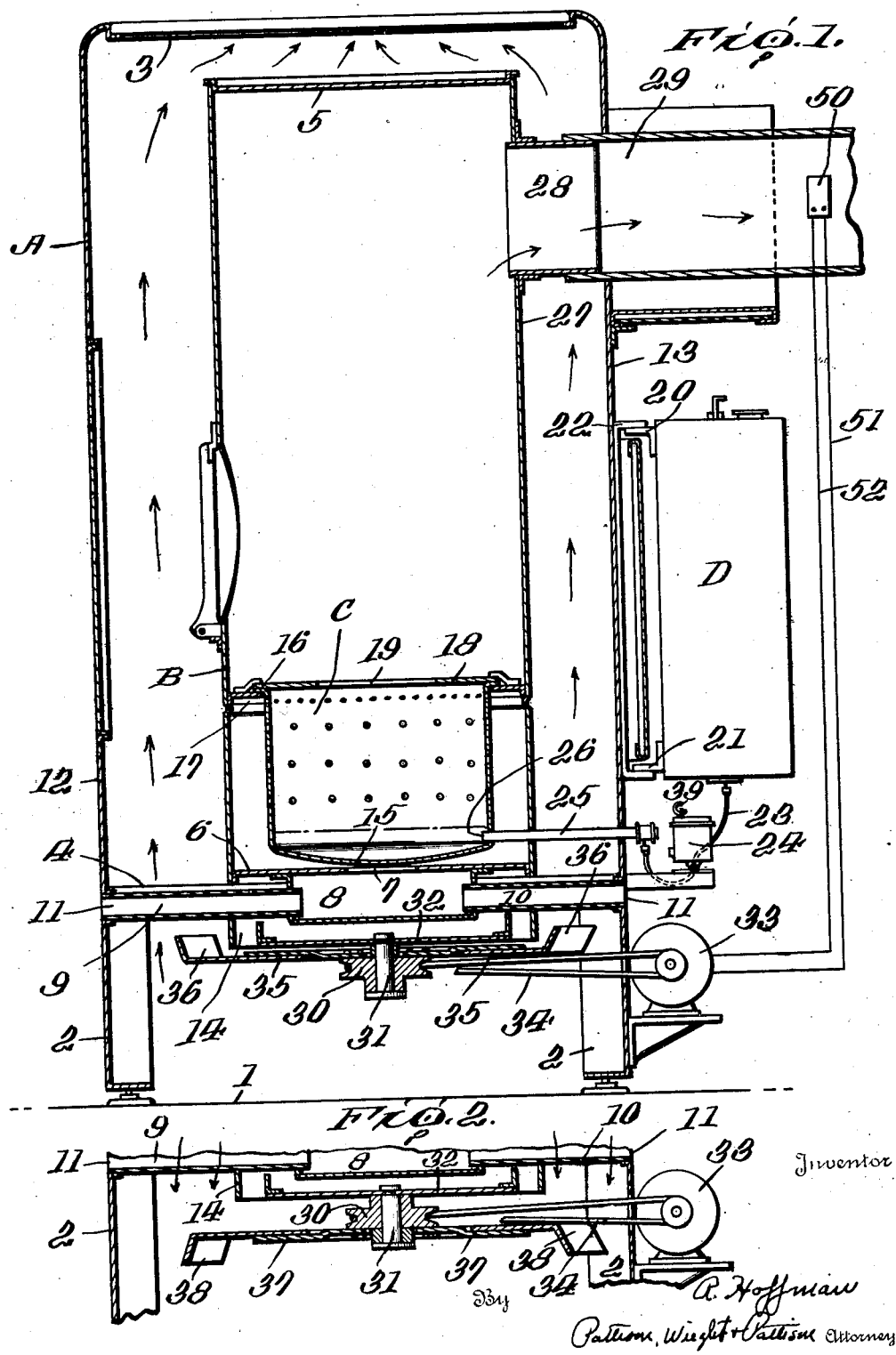

2,162,084

UNITED STATES PATENT OFFICE 2,162,084

ROOM HEATER

Rudolph Hoffman, Rocky River, Ohio, assignor to American Stove Company, St. Louis, Mo., a corporation of New Jersey Application April 1, 1938, Serial No. 199,522

7 Claims. (Cl. 126—67)

This invention relates to an improved room heater and has as its primary object the provision of an oil burning room heater provided with a heat circulating means which will assure a more even temperature in the room and which will enable the heater to be equipped with a thermostatic control.

Another and further object of the invention is the provision of an improved oil burning room heater equipped with a thermostatic means for controlling the heat generated by said heater and provided with a heat circulating means which will cause an even distribution of heat throughout the room in which the heater is located and will thereby enable successful and efficient thermostatic control of the heat within the room.

A still further object of the invention is the provision of a room heater having the above enumerated attributes, which is comparatively cheap and simple of manufacture and highly efficient in operation.

Another and still further object of the invention is the provision of a novel, comparatively cheap and highly efficient means to be used in combination with a room heater for causing the circulation within the room of the air heated by said heater.

Other specific objects, novel features of construction and improved results of the invention will appear in more detail from the following description when read in the light of the accompanying drawing in which is illustrated two mechanical embodiments of the invention which are capable of accomplishing the desired results.

In the drawing:

Fig. 1 is a vertical sectional view through a room heater embodying the present improved invention.

Fig. 2 is a fragmentary vertical sectional view through the lower end of the heater illustrating a modified form of the invention.

Referring now to the drawing and particularly Fig. 1 thereof and utilizing the same reference letters and numerals to designate like parts throughout the description, A designates a housing or casing which is preferably although not necessarily made of metal. The casing can be either of square, rectangular or circular form and is supported above the floor 1 by suitable legs 2.

At its upper end the casing is provided with a grill 3 while its lower end 4 is open to free communication with the room at a point comparatively close to the floor level.

The drum B is disposed within the casing A and approximately concentrically arranged therein and of a dimension so that it is in spaced relationship at its sides and top to the sides and grill of the casing. The drum top is indicated at 5 and its bottom at 6. This bottom 6 is provided with an air inlet opening 7 having communication with an air chamber 8 to which air from the room is fed through suitable air intake pipes 9, 10, which are preferably horizontally disposed and have their outer open ends 11 terminating flush with the front and rear walls 12 and 13 respectively of the casing. The vertical walls of the drum extend downwardly beyond the drum bottom 6 to provide a skirt 14 within which is positioned the aforementioned air chamber 8 and through the walls of which pass the aforementioned air intake pipes 9 and 10.

A burner pot C is positioned within the lower end of the heating drum B and suitably supported with its bottom 15 in spaced relationship to the bottom 6 of the drum by being supported as indicated at 16 upon a suitable ring or collar 17. The upper end of the burner pot is partially closed by a plate 18 having a centrally disposed opening 19 through which the flame passes when the burner is in operation.

An oil tank D is suitably secured as at 20 and 21 to a bracket 22 carried on the outer face of the rear wall 13 of the casing A. Oil is fed from this tank by gravity through a pipe 23 in which is positioned both manual and thermostatically operated fuel valves designated as an entirety at 24. The fuel pipe 23 at its outlet end communicates with a larger pipe 25 which has its open end 26 within the burner pot adjacent the lower end thereof.

The drum adjacent its upper end is provided in its rear wall 27 with an outlet flue 28 to which is attached an outlet flue pipe 29 which leads to a suitable chimney flue or other suitable outlet means (not shown) and discharges into the atmosphere exterior of the room or house within which the heater is disposed.

A pulley 30 is rotatably mounted on a stub shaft 31 extending downwardly from a plate 32 and has driving connection with a motor 33 by means of a belt 34 or the like. A fan made up of a plurality of blades 35 is secured to and rotatable with the pulley. These fan blades are elongated so that their outer ends 36 are positioned outwardly beyond the heating drum so that as the fan is rotated these blades will cause air to be drawn from the room at a point adjacent the floor level and caused to circulate through the casing in the space between the casing walls and the walls of the heating drum to pass outwardly through the grill 3 at the upper end of the casing as indicated by arrows.

In Fig. 2 of the drawing a modified form of the invention is illustrated. This construction is identical with that heretofore described with the exception that the fan blades 37 have their outer ends 38 shaped to cause a down draft through the heater so as to pull the air downwardly through the grill 3 at the upper end of the casing and cause it to discharge against the floor through the lower end of the casing.

In connection with both the preferred and modified form of the invention automatic operation of the motor 33 and the fan is provided for. 50 indicates any well known form of stack thermostat which is in the electric supply lines 51 and 52 to the motor with the result that the thermostat 50 will break the current delivery to the motor when heat is not passing through the outlet pipe or stack 29. This will assure operation of the motor and fan only when the heater is in operation to deliver heated air into the room. It would of course not be desirable for the fan to operate when there is no flame in the burner pot or when the flame in the burner pot is merely a pilot flame because its operation at such a time would result only in the delivery of cold air into the room through the heater.

The thermo element 50 therefore operates to cause operation of the fan when the heater is delivering any predetermined amount or degree of hot air through the outlet pipe 29 and discontinue operation of the fan when the heater is not burning a flame of sufficient size to deliver any appreciable heat either to the room or to the outlet pipe 29.

Although it is not so illustrated in the drawing it will be understood that if it should be desirable a remote thermostat control could be placed on the wall of the room for operating the fuel valve in the fuel line between the fuel tank and the pot burner. Even with a wall positioned thermostatic control the operation thereof to obtain and maintain an even temperature in the room will be facilitated by the circulation of air in the room by the fan.

It has been found in respect to room heaters of the type here illustrated and when no heat circulating means is provided, that the heated air rises through the casing and is discharged upwardly through the grill into the room and then travels to the upper area of the room by reason of the fact that heated air is lighter than cold air. It has been further found that when a heater has been operated over a period sufficiently long to have caused the heating of the room that the room is still cold adjacent the floor level and that the room is of an uncomfortable temperature to the feet and lower legs of persons within the room. In addition to this disadvantage and serious objection the thermostatic valve 24, being positioned as it is near the floor level, will function to continue the operation of the room heater with the result that the temperature of the room, except adjacent the floor level, will become uncomfortably warm and will reach a temperature greater than that desired by the room occupants. In other words, the thermostat will not function to cut off the operation of the heater when the room temperature has reached that degree of heat at which the thermostat has been set.

The present improvement will overcome the objections and disadvantages above pointed out which have been inherent in room heaters as they have been heretofore made, sold and operated. With the construction illustrated in Fig. 1 of the drawing the fan will cause the cold air adjacent the floor level to be drawn into the bottom of the heater and made to wipe along the hot walls of the heating drum and will be discharged outwardly through the grill at the upper end of the heater with sufficient velocity and force as to cause a circulation in the room and the heated air adjacent the room ceiling will move downwardly towards the floor level. The air within all areas of the room, due to the operation of the fan, will be caused to circulate in a manner to accomplish the attainment of a comparatively even temperature in all areas of the room including that area adjacent the floor level. This will result in the desired control and operation of the heater in accordance with the predetermined setting of the thermostatically operated valve. The room temperature adjacent the thermostatically operated valve and to which it is responsive will be substantially the same as the temperature in all areas of the room irrespective of their horizontal levels.

In the modified construction illustrated in Fig. 2 of the drawing the objections heretofore referred to are likewise overcome but in this instance are overcome by setting up the circulation of air in the room in the reverse direction to that accomplished by the construction illustrated in Fig. 1 of the drawing. In the modified embodiment of the invention the warm air is discharged through the bottom of the heater against the floor and at the floor level. The heated air which is normally adjacent the ceiling of the room is caused to move downwardly towards the heater and the floor level with the result that this circulation will cause such intermingling of the air within the room as to create a substantially even temperature in all areas of the room including the area adjacent the thermostatically operated valve.

The operation of the burner is of course definitely under the control of the operator through the manually operated valve 39. This valve is opened when it is desired to light the heater and is completely closed when no heat whatsoever is desired. The thermostatically operated valve is such that when the room temperature has reached a degree of heat at which the thermostatic valve is caused to operate this valve will reduce the flame to a mere pilot flame. The thermostatically operated valve does not shut off the fuel delivery completely. The small pilot flame which this valve will cause to be maintained in the burner pot is so small as to cause practically no generation of heat but at the same time leaves the heater in a position whereby the thermostat can increase the flame to generate heat whenever the room temperature drops.

Although the thermostatic valve is illustrated in the drawing as being exterior of the cabinet it is to be understood that this valve could be placed within the cabinet without departing from the spirit of the present invention. Were the thermostat so located it would be disposed adjacent the lower end of the cabinet and be properly insulated from the heat of the radiating unit so as to be responsive to the room temperature rather than the temperature of said unit.

From the foregoing description and by reference to the drawing it will be evident that in creating the upward or downward forced draft through the heater the normal and proper delivery of air to the pot burner is in no way interfered with or disturbed and that the improved results due to the circulation of air set up in the room is accomplished without in any manner unbalancing or detrimentally affecting the efficient and proper operation of the burner.

It will also be obvious that the positioning of the fan is such as to most efficiently effect the desired results and at the same time be practically completely hidden from view and thus not in any way detract from the appearance of the heater.

I claim:

1. A heater for a room or the like comprising, a casing having openings in its upper and lower ends, the lower end of said casing supported above but closely adjacent the floor line of said room, a heating drum in said casing and arranged in separated relationship to the walls thereof to form passageways having communication with the openings in the upper and lower ends respectively of said casing, a burner in said drum, a fuel supply for said burner, a thermostatically operated valve disposed in said fuel line and positioned exterior of the casing adjacent the lower end thereof and a thermostat in the outlet of the upper end of said casing and controlling said fan, and means for creating a forced draft through said casing passageways, for the purpose described.

2. A heater for a room or the like comprising, a casing having openings in its upper and lower ends, the lower end of said casing supported above but closely adjacent the floor line of said room, a heating drum in said casing and arranged in separated relationship to the walls thereof to form passageways having communication with the openings in the upper and lower ends respectively of said casing, a burner in said drum, a fuel supply for said burner, a thermostatically operated valve disposed in said fuel line and positioned exterior of the casing adjacent the lower end thereof, a fan disposed beneath the lower end of said casing for drawing air to and pulling the same downwardly through said casing passageways to discharge through the lower end of the casing adjacent the room floor level and a thermostat in the outlet flue of said burner drum for controlling the operation of the said fan and thereby controlling the circulation of air in said heater, for the purpose described.

3. A room heater or the like comprising, a casing having a grilled opening in its upper end, a heating drum in said casing arranged in separated relationship to the walls thereof to form passageways having communication at their upper ends with the grilled opening of the casing, said casing supported above the floor and the lower ends of said passageways having communication with the room adjacent the floor level thereof, a burner in said drum, a fan having substantially horizontally disposed blades disposed beneath said casing and drum and rotatable in respect thereto, said blades extending beyond the walls of said drum and across the lower ends of said casing passageways, means to rotate said fan for creating a forced draft through said casing passageways and a thermostat in the outlet flue of the burner drum for controlling said fan and thereby controlling the air circulation in the casing passageways, for the purpose described.

4. In combination with a room heater, a fan creating a forced draft therethrough, a burner, a fuel supply therefor, a thermostat controlling said fuel supply and a thermostat responsive to the heat of said burner and controlling the fan and thereby the air circulation through the heater and said thermostats jointly cooperating to control the heat and air produced by said heater, for the purpose described.

5. A combined room oil heater for causing the quick circulation of cold air from the floor of the room, comprising a casing having its lower end placed substantially at the floor of the room, said casing having its lower end in communication with the air at the floor of the room, a vertically arranged burner drum within said casing and forming a passage through the casing, a burner within the lower end of the said burner drum, a horizontally rotating fan in the open lower end of the casing, said fan drawing air from the floor of the room and forcing it upward through the said casing and out the upper end thereof and drawing the cold air into the heater and forcing it through the upper end of the said casing and to the upper portion of said room thereby causing a rapid upward circulation of the cold air and pulling the warm air downward from the upper part of the room as well as causing a horizontal circulation of the warm and cold air in the lower portion of the room whereby the cold air on the floor of the room is rapidly heated.

6. A room oil heater, comprising an elongated casing having openings in the upper and lower ends, a burner drum within said casing having a closed lower end, a burner pot within said drum having a closed bottom and a single vertically extending perforated wall separated from said drum wall, the wall of said drum and said casing in separated relationship forming a passageway in communication with the open ends of said casing, a horizontal rotatable fan located in the lower end of said casing below the closed lower end of said drum and in a vertical line below the closed end of said burner drum and said passageway in said casing, and a pipe extending across said casing and supplying air to said burner independently of the air from said fan.

7. A room oil heater comprising an elongated casing having openings in its upper and lower ends, a burner drum within said casing having a closed lower end, the walls of said drum and said casing in separated relationship thereby forming a passageway in communication with the openings in the ends of said casing, a horizontally rotatable fan located in the lower end of the said casing below the closed lower end of said drum and supplying air to the said casing passageway only, the bottom of the drum having an opening communicating outside of the said casing and communicating with the lower end of the drum immediately below the burner thereby supplying air to the said burner independently of the air from said fan.

RUDOLPH HOFFMAN.